(12) United States Patent
Horibe et al.

(10) Patent No.: US 12,039,962 B2
(45) Date of Patent: *Jul. 16, 2024

(54) SOUNDPROOFING STRUCTURE

(71) Applicant: NISSAN MOTOR CO., LTD., Yokohama (JP)

(72) Inventors: Norifumi Horibe, Kanagawa (JP); Susumu Miura, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 358 days.

This patent is subject to a terminal disclaimer.

(21) Appl. No.: 17/430,428

(22) PCT Filed: Feb. 13, 2019

(86) PCT No.: PCT/IB2019/000171
§ 371 (c)(1),
(2) Date: Aug. 12, 2021

(87) PCT Pub. No.: WO2020/165619
PCT Pub. Date: Aug. 20, 2020

(65) Prior Publication Data
US 2022/0189445 A1    Jun. 16, 2022

(51) Int. Cl.
*G10K 11/16* (2006.01)
*B32B 3/12* (2006.01)
(Continued)

(52) U.S. Cl.
CPC ............ *G10K 11/168* (2013.01); *B32B 3/12* (2013.01); *B32B 25/08* (2013.01); *B32B 25/12* (2013.01);
(Continued)

(58) Field of Classification Search
CPC .... G10K 11/16; G10K 11/168; G10K 11/172; G10K 2210/1282; G10K 2210/3223;
(Continued)

(56) References Cited

U.S. PATENT DOCUMENTS 3,087,574 A * 4/1963 Watters ............. B32B 17/10165
181/208
3,353,626 A * 11/1967 Cremer ................. F16L 55/033
181/224
(Continued)

FOREIGN PATENT DOCUMENTS

CA      3071098 A1   1/2019
EP      3 852 097 A1  7/2021
(Continued)

OTHER PUBLICATIONS

Ni Sui et al., Applied Physics Letters 106, 171905, Apr. 2015, 6 pages.
(Continued)

*Primary Examiner* — Edgardo San Martin
(74) *Attorney, Agent, or Firm* — Foley & Lardner LLP

(57) ABSTRACT

To provide a means capable of suppressing deterioration in the soundproofing performance of a soundproofing material capable of exhibiting high soundproofing performance over a wide range of a frequency range of 2000 Hz or less.
A soundproofing material including a sheet having elasticity, and a support portion partitioning the sheet into a partition portion while supporting the sheet is configured so that a surface rigidity (k) of the sheet and a surface density (m) of the sheet in the partition portion satisfy a relationship of the following Expression 1. Further, the soundproofing material is disposed on a substrate so that the sheet is separated from the substrate to configure a soundproofing structure:

$$\frac{1}{2\pi}\sqrt{\frac{k}{m}} > 900[\text{Hz}] \qquad [\text{Expression 1}]$$

8 Claims, 9 Drawing Sheets

(51) Int. Cl.
- B32B 25/08 (2006.01)
- B32B 25/12 (2006.01)
- B32B 27/30 (2006.01)
- G10K 11/168 (2006.01)
- G10K 11/172 (2006.01)

(52) U.S. Cl.
CPC ...... *B32B 27/304* (2013.01); *B32B 2307/102* (2013.01); *B32B 2307/732* (2013.01); *G10K 11/172* (2013.01)

(58) Field of Classification Search
CPC ......... B32B 3/12; B32B 15/06; B32B 15/082; B32B 25/08; B32B 25/14; B32B 27/08; B32B 27/304; B32B 27/32; B32B 5/02; B32B 2307/102; B32B 2307/732; E04B 1/86; E04B 1/84; E04B 2001/8476; B60R 13/08; B60R 13/0815

See application file for complete search history.

(56) References Cited

U.S. PATENT DOCUMENTS

| | | | | |
|---|---|---|---|---|
| 3,983,955 | A * | 10/1976 | Vasiljevic | G10K 11/172 428/116 |
| 4,084,366 | A * | 4/1978 | Saylor | E04B 1/8227 428/116 |
| 4,241,806 | A * | 12/1980 | Metzger | E04B 1/86 428/313.9 |
| 4,265,955 | A * | 5/1981 | Harp | B29D 24/005 428/116 |
| 4,294,329 | A * | 10/1981 | Rose | B32B 3/12 428/116 |
| 4,734,323 | A * | 3/1988 | Sato | B60R 13/0815 181/294 |
| 5,106,668 | A * | 4/1992 | Turner | B32B 15/20 428/116 |
| 6,298,963 | B1 * | 10/2001 | Kim | F16F 9/306 267/136 |
| 10,850,472 | B2 * | 12/2020 | Horibe | B32B 25/08 |
| 2004/0005449 | A1 | 1/2004 | Sugimoto et al. | |
| 2014/0326536 | A1 * | 11/2014 | Vauchel | G10K 11/002 181/290 |
| 2020/0147921 | A1 | 5/2020 | Horibe et al. | |
| 2021/0341028 | A1 * | 11/2021 | Fukui | B32B 15/20 |
| 2022/0130363 | A1 * | 4/2022 | Horibe | B32B 27/08 |
| 2022/0189445 | A1 | 6/2022 | Horibe et al. | |

FOREIGN PATENT DOCUMENTS

| | | | |
|---|---|---|---|
| JP | H10-054096 A | | 2/1998 |
| JP | 2004-042649 A | | 2/2004 |
| JP | 2012-073472 A | | 4/2012 |
| JP | 2013-174849 A | | 9/2013 |
| JP | 5597913 B2 * | | 10/2014 |
| JP | 2021096304 A * | | 6/2021 |
| JP | 2021189212 A * | | 12/2021 |
| WO | WO 2019/022245 A1 | | 1/2019 |
| WO | WO-2019022245 A1 * | | 1/2019 ............. B32B 15/06 |

OTHER PUBLICATIONS

European Office Action issued in connection with EP Appl. Ser. No. 20756699.3 dated Jul. 13, 2023.

Japanese Office Action issued in connection with JP Appl. Ser. No. 2020-571922, dated Feb. 28, 2023.

* cited by examiner

SOUNDPROOFING STRUCTURE

TECHNICAL FIELD

The present invention relates to a soundproofing structure.

BACKGROUND ART

There are many sound sources in automobiles. As it is necessary to improve quietness by blocking noise from inside and outside the vehicle, various soundproofing measures are being implemented in automobiles. In particular, soundproofing measures should be taken in the vicinity of generation sources for portions that generate loud sounds (inherent sound sources), such as an engine, a transmission, and a drive system. For this reason, dedicated soundproofing covers having excellent sound absorption and insulation performance are used for these sound sources. Here, as the reinforcement of out-of-vehicle noise regulations by continuous law revisions or the quietness of in-vehicle noise is directly connected to the value (high-quality feeling) of the vehicle, the demand for low noise components in automobiles is very high. In particular, the out-of-vehicle noise regulations introduced in the European Union (EU) in 2013 are eventually stricter as −3 dB (necessary to reduce sound pressure energy to ½) with respect to the conventional regulation value. For this purpose, noise reduction measures for an engine body as a main noise generation source in the engine room and an inherent sound source such as a transmission are indispensable. Various soundproofing components such as an engine top cover on the upper surface side of the engine have been used so far, but improvement in performance is further required. It is preferable that the soundproofing measures can meet the request for weight reduction from the viewpoint of low fuel consumption.

Various configurations of soundproofing structures aiming at soundproofing are known, but among those, a material called "acoustic metamaterial" is present. The "acoustic metamaterial" is an artificial medium designed to exhibit acoustic properties that are not normally exhibited by substances present in nature. Conventionally, the acoustic metamaterial exhibiting a desired soundproofing effect has been intensively developed, and various proposals have been made.

Here, there has been known that when a sound wave of a frequency on a single wall made of a homogeneous material is vertically incident, a value of transmission loss (TL) by the single wall is calculated as TL $20 \log_{10}(m \cdot f) - 43$ [dB] using a frequency (f) and a surface density (m) of the single wall (mass law). That is, generally, the lighter the soundproofing material and the lower the frequency of the sound wave, the smaller the transmission loss (TL) and the lower the soundproofing performance. For example, in the case of a sound wave of 500 Hz, to achieve STL of 20 dB, a size of 12 cm for a concrete wall and a size exceeding 35 cm for a urethane foam sound insulation material are required.

In view of such a situation, for example, Ni Sui et al., Applied Physics Letters 106, 171905 (2015) proposes an acoustic metamaterial composed of a lattice-like structure in which a latex rubber film is hermetically supported by an aramid fiber sheet honeycomb that has a plurality of continuously formed cylindrical cells. Here, in the lattice-like structure disclosed in Ni Sui et al., Applied Physics Letters 106, 171905 (2015), the latex rubber film is partitioned into a partition portion having a regular hexagon (one side length is 3.65 mm) by a plurality of cylindrical cells.

Ni Sui et al., Applied Physics Letters 106, 171905 (2015) discloses that by using such an acoustic metamaterial, it is possible to provide a material that has excellent soundproofing performance against, in particular, low-frequency sound waves even if the material is lightweight and an STL exceeding 25 dB can be achieved for sound waves of a frequency of less than 500 Hz by experiments.

SUMMARY OF INVENTION

Technical Problem

However, it became clear by the examination of the present inventors that, when the acoustic metamaterial as described in Ni Sui et al., Applied Physics Letters 106, 171905 (2015) is used as a soundproofing material, sufficient soundproofing performance over a wide frequency range of 2000 Hz or less cannot be exhibited.

Therefore, the present inventors have conducted a study for the purpose of providing a means capable of exhibiting high soundproofing performance over a wide range of a frequency range of 2000 Hz or less. As a result, the present inventors have found that, in a soundproofing material (acoustic metamaterial) including a sheet having elasticity and a support portion that partitions the sheet into a partition portion while supporting the sheet as described in Ni Sui et al., Applied Physics Letters 106, 171905 (2015), by controlling the surface rigidity and surface density of the sheet constituting the partition portion to satisfy a predetermined relationship, high soundproofing performance can be exhibited over a wide range of a frequency range of 2000 Hz or less (in particular, 400 to 1000 Hz), and have applied a patent for the invention (PCT/JP2018/028326).

Here, when the soundproofing material (acoustic metamaterial) as described above is applied to vehicles and the like, the soundproofing material is generally laminated with a substrate for disposing the soundproofing material. However, as a result of further studies carried out by the present inventors, the present inventors have found that the soundproofing performance of the soundproofing material may not be sufficiently exhibited depending on an application form when the soundproofing material is used.

Therefore, an object of the present invention is to provide a means capable of suppressing deterioration in the soundproofing performance of a soundproofing material capable of exhibiting high soundproofing performance over a wide range of a frequency range of 2000 Hz or less.

Solution to Problem

The present inventors have conducted intensive studies in view of the above problems. As a result, the present inventors have found that, in the soundproofing material (acoustic metamaterial) as described above, deterioration in soundproofing performance can be suppressed by controlling the surface rigidity and surface density of a sheet constituting a partition portion to satisfy a predetermined relationship, and by disposing the soundproofing material at a position separated from a substrate, and have completed the present invention.

That is, according to one aspect of the present invention, there is provided a soundproofing structure including: a substrate; and a soundproofing material disposed at a position separated from the substrate on the substrate. Here, the soundproofing material includes a sheet having elasticity, and a support portion partitioning the sheet into a partition portion while supporting the sheet. The soundproofing material is characterized in that a surface rigidity (k) and surface density (m) of the sheet in the partition portion satisfy a relationship of the following Expression 1:

[Math. 1]

$$\frac{1}{2\pi}\sqrt{\frac{k}{m}} > 900[\text{Hz}] \quad \text{[Expression 1]}$$

BRIEF DESCRIPTION OF DRAWINGS

FIG. 12 is a graph showing results of Comparative Examples 1-1 and 1-2 and Examples 1-1 and 1-2.

FIG. 13 is a graph showing results of Comparative Examples 2-1 and 2-2 and Examples 2-1 and 2-2.

FIG. 14 is a graph showing results of Comparative Examples 3-1 and 3-2 and Example 3-1.

FIG. 15 is a graph showing results of Comparative Example 4-1 and Examples 4-1 to 4-4.

DESCRIPTION OF EMBODIMENTS

Figure 1:
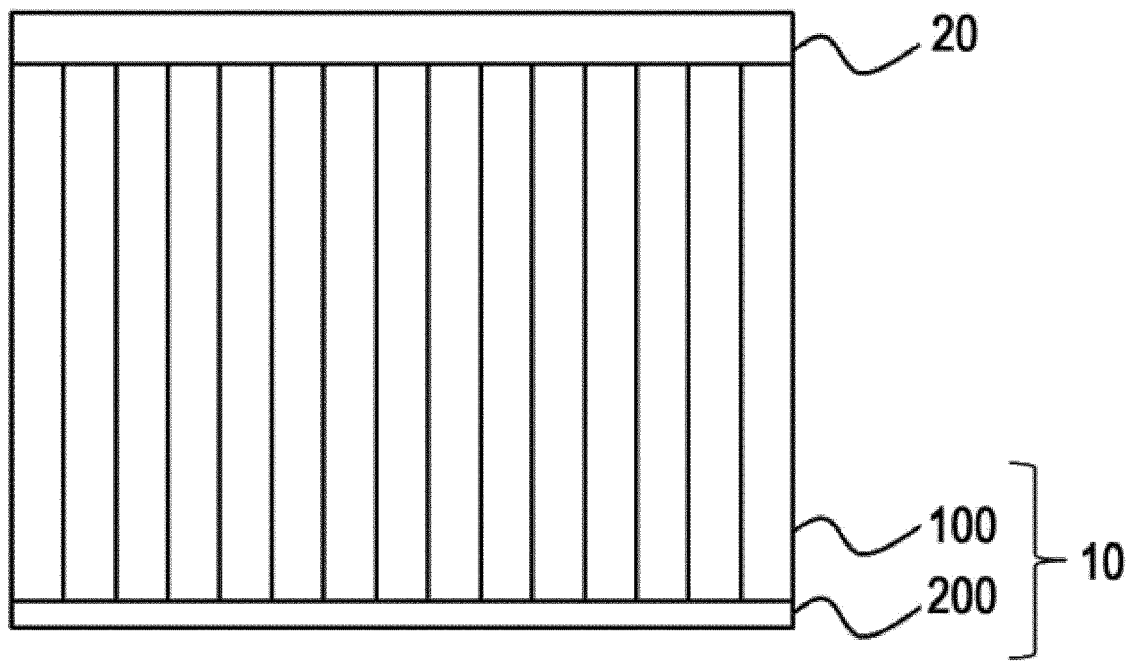
FIG. 1 is a side view showing the appearance of a soundproofing structure according to an embodiment of the present invention.

One aspect of the present invention is a soundproofing structure including: a substrate; and a soundproofing material disposed on the substrate, wherein: the soundproofing material includes a sheet having elasticity, and a support portion partitioning the sheet into a partition portion while supporting the sheet; the soundproofing material is disposed on the substrate so that the sheet is separated from the substrate; and a surface rigidity (k) of the sheet and a surface density (m) of the sheet in the partition portion satisfy a relationship of the following Expression 1:

[Math. 2]

$$\frac{1}{2\pi}\sqrt{\frac{k}{m}} > 900[\text{Hz}] \quad \text{[Expression 1]}$$

A calculation method of the surface rigidity (k) and the surface density (m) in the Expression 1 will be described later.

Hereinafter, embodiments of the present invention will be described with reference to the drawings, but the technical scope of the present invention should be defined based on the description of the scope of claims, and is not limited to only the following embodiments. Dimensional ratios in the drawings are exaggerated for the convenience of description, and may differ from the actual ratios. In this specification, "X to Y" indicating a range means "X or more and Y or less". Unless otherwise specified, operations and measurements of physical properties and the like are performed under conditions of room temperature (20 to 25° C.)/relative humidity 40 to 50%.

Figure 2:
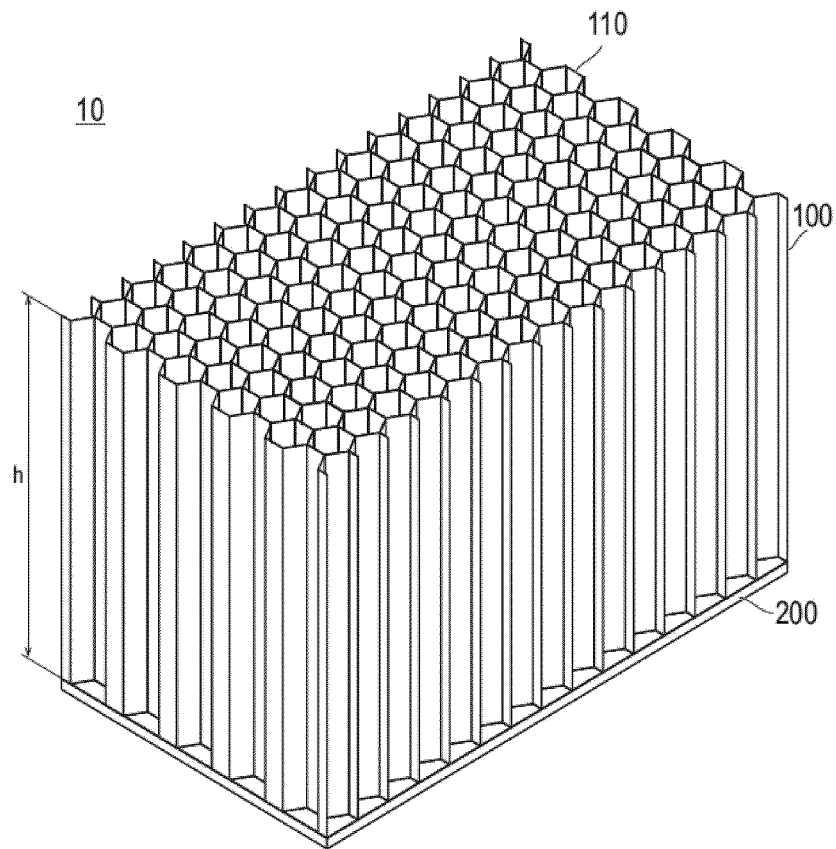
FIG. 2 is a perspective view showing the appearance of a soundproofing material according to an embodiment of the present invention.
Figure 3:
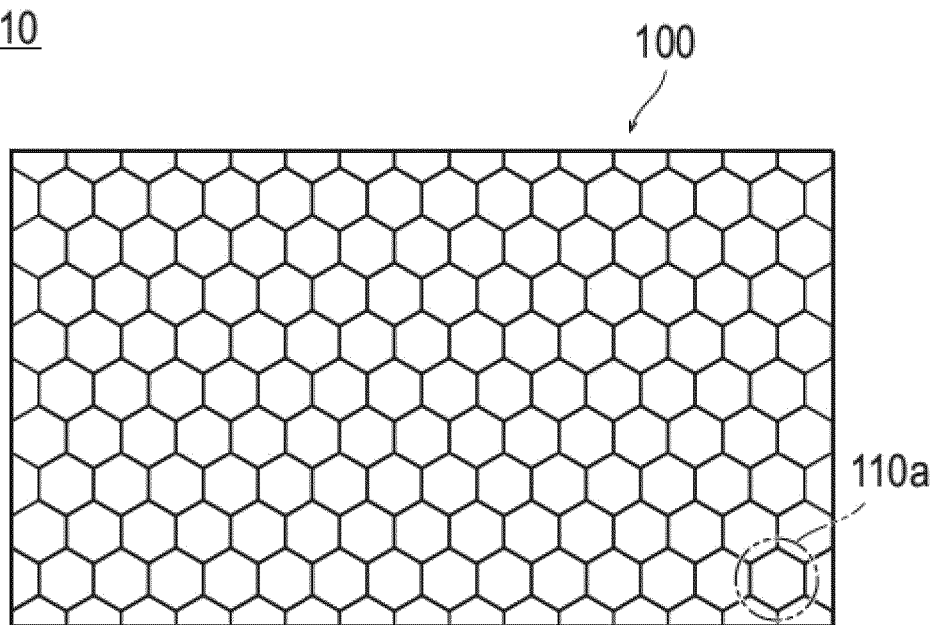
FIG. 3 is a top view of the soundproofing material according to an embodiment of the present invention.
Figure 4:
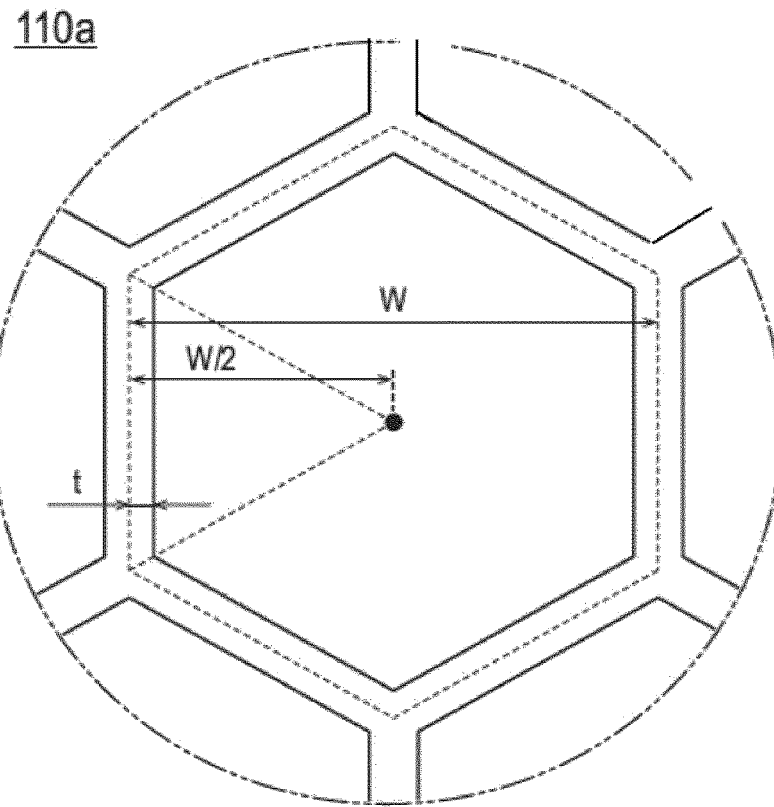
FIG. 4 is an enlarged cross-sectional view for describing the cross-sectional shape and size of a cylindrical cell constituting the soundproofing material according to an embodiment of the present invention.

FIG. 1 is a side view showing the appearance of a soundproofing structure according to an embodiment of the present invention. FIG. 2 is a perspective view showing the appearance of a soundproofing material constituting the soundproofing structure according to an embodiment of the present invention. FIG. 3 is a top view of the soundproofing material constituting the soundproofing structure according to an embodiment of the present invention. FIG. 4 is an enlarged cross-sectional view for describing the cross-sectional shape and size of a support portion of the soundproofing material constituting the soundproofing structure according to an embodiment of the present invention.

As shown in FIG. 1, a soundproofing structure 1 according to an embodiment of the present invention includes a soundproofing material 10 and a substrate 20. As shown in FIGS. 1 and 2, the soundproofing material 10 according to an embodiment of the present invention includes a lattice-like structure 100 (support portion) that is composed of cylindrical cells continuously (regularly) arranged and a latex rubber sheet 200 that is composed of latex rubber having elasticity. The latex rubber sheet 200 is hermetically bonded to the lattice-like structure 100 so as to close one side of openings on both sides of the lattice-like structure 100, and functions as a sheet-like substrate. The thickness of the latex rubber sheet 200 in the present embodiment is 0.25 mm (250 µm). Meanwhile, in the present embodiment, the lattice-like structure 100 is made of a polyvinyl chloride resin. The lattice-like structure 100 has a large number of continuously (regularly) formed cylindrical cells 110.

As shown in FIG. 1, in the soundproofing structure 1 according to the present embodiment, the soundproofing material 10 is disposed on the substrate 20 so that the opening cross section (the surface on the opposite side of the side where the latex rubber sheet 200 is disposed) of the lattice-like structure 100 (support portion) constituting the soundproofing material 10 is in contact with the substrate. In other words, the soundproofing material 10 is disposed on the substrate 20 so that the latex rubber sheet 200 is separated from the substrate 20 (so that the latex rubber sheet 200 is not in direct contact with the substrate 20). Here, in the present specification, "the soundproofing material is disposed on the substrate" does not mean only that the soundproofing material is disposed vertically above the substrate. The soundproofing material may be disposed in any direction with respect to the substrate as long as the soundproofing material and the substrate are disposed so that the sheet constituting the soundproofing material is separated from the substrate. For example, as shown in FIG. 1, the soundproofing material 10 may be disposed vertically below the substrate 20.

Thus, by disposing the sheet constituting the soundproofing material so as to be separated from the substrate, the vibration of the soundproofing material (in particular, the sheet having elasticity and constituting the soundproofing material) is less likely to be affected by the vibration of the substrate. As a result, the soundproofing material (in particular, the sheet having elasticity and constituting the soundproofing material) can sufficiently vibrate, whereby the soundproofing material can sufficiently exhibit a soundproofing effect.

As shown in FIGS. 2 and 3, in the soundproofing material 10 according to the present embodiment, the cross-sectional shape of the cylindrical cell 110 on a cross section (paper surface of FIG. 3) perpendicular to an extending direction of the lattice-like structure 100 is a regular hexagon. That is, the lattice-like structure 100 has a so-called honeycomb structure. As a result, the lattice-like structure 100 according to the present embodiment partitions the latex rubber sheet 200 into a plurality of (a large number of in FIGS. 2 and 3) partition portions while supporting the latex rubber sheet 200 as the sheet-like substrate. The plurality of partition portions form a regular arrangement structure in which the plurality of partition portions having the same outline shape are regularly arranged.

The cell size (distance between opposing parallel sides in a regular hexagon of a cross-sectional shape; distance w shown in FIG. 4) of one cylindrical cell (110a in FIG. 4) constituting the honeycomb structure is 4 mm. With such a configuration, it is possible to realize excellent soundproofing performance with a very simple structure. Furthermore, as shown in FIG. 4, the lattice-like structure 100 can be regarded as being configured by connecting a large number of cylindrical cells 110 having walls therearound. In the present embodiment, the thickness (distance t shown in FIG. 4) of the wall of the cylindrical cell is 0.07 mm (70 µm). The height (distance h shown in FIG. 2) of the lattice-like structure (cylindrical cell) in the extending direction is 25 mm, and the lattice-like structure is composed of a single structure having a uniform height.

As described above, the soundproofing material having the configuration shown in FIGS. 2 and 3 can realize excellent soundproofing performance with a very simple configuration. In particular, the soundproofing material can express characteristics that high soundproofing performance can be exhibited over a wide frequency range of 2000 Hz or less even if the soundproofing material is lightweight and has a simple configuration, which cannot be achieved by the conventional technique.

The present inventors have intensively studied a mechanism by which the soundproofing material as in the above-described embodiment exhibits such excellent soundproofing performance. As a result, the present inventors have found that a mechanism different from the soundproofing material conventionally applied to vehicles and the like is involved, and have completed the present invention. The mechanism finally found has overturned the conventional common sense regarding the soundproofing material applied to vehicles and the like. Hereinafter, the mechanism by which the soundproofing material according to the present embodiment exhibits excellent soundproofing performance and the configuration of the present invention completed based on the mechanism clarified by the present inventors will be described in order.

Figure 5:
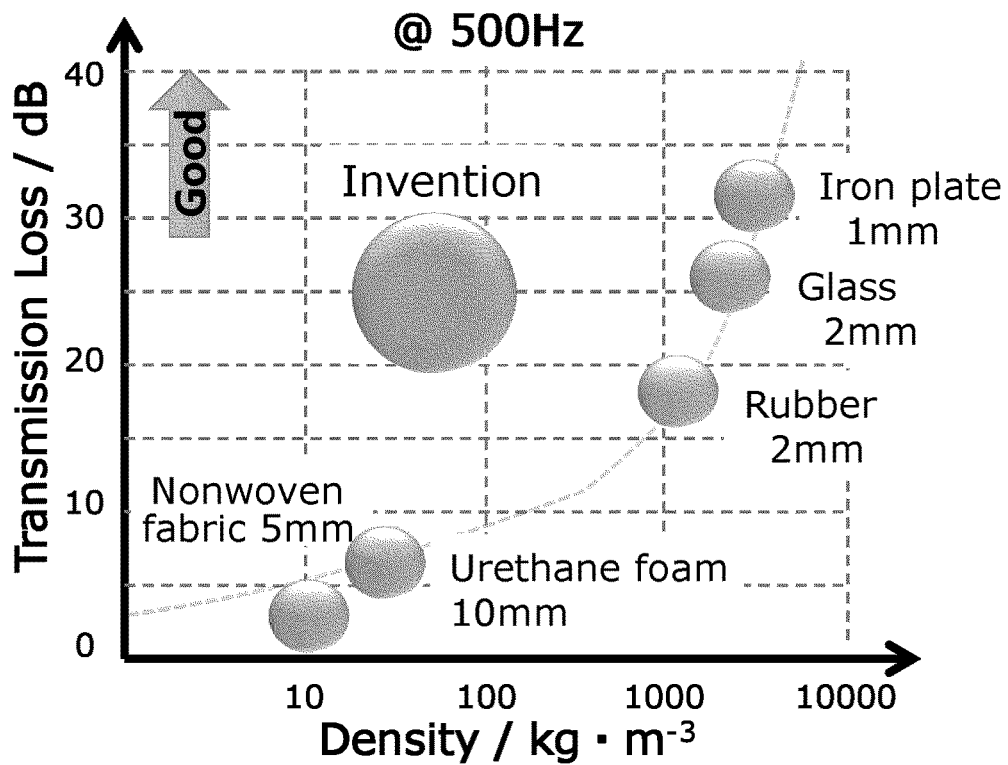
FIG. 5 is a graph for describing the soundproofing performance (transmission loss @ 500 Hz) of the soundproofing material according to the present invention in comparison with a performance trend in a conventionally known soundproofing material.

First, the soundproofing performance (@ 500 Hz) of the soundproofing material according to the present invention is shown in FIG. 5 in the form that contrasts with the performance trend of the conventionally known soundproofing material. As shown in FIG. 5, the conventionally known soundproofing material has the performance trend that the soundproofing performance (transmission loss) is improved as the density of the constituent material is increased. The performance trend in the conventionally known soundproofing material is known as "mass law". The theoretical value of the transmission loss (TL) in the soundproofing material according to the mass law is calculated according to the following Expression 2 using a frequency (f) of a sound wave to be targeted and a surface density (m; mass per unit area) of the soundproofing material.

[Math. 3]

$$TL[dB] \approx 20 \log_{10}(m \cdot f) - 43 \qquad \text{[Expression 2]}$$

Figure 6:
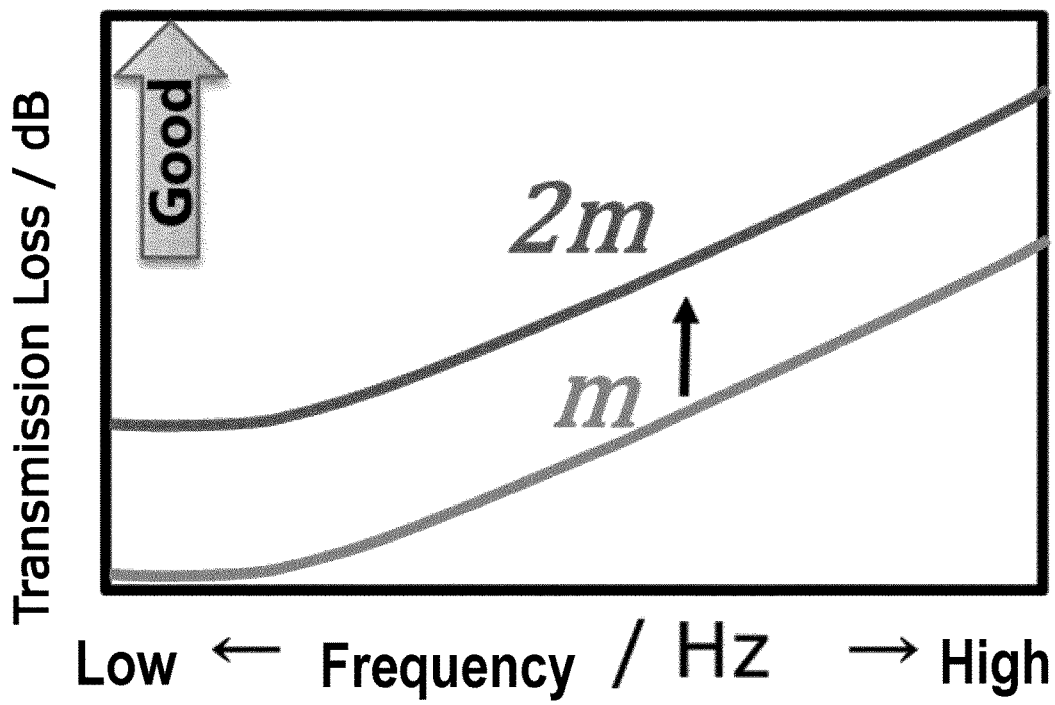
FIG. 6 is a graph for describing a change in soundproofing performance (transmission loss) according to a mass law when the surface density of the soundproofing material is increased.

For this reason, if the surface density of the soundproofing material is increased, the soundproofing performance (transmission loss (TL)) can be improved, but on the other hand, the surface density of the soundproofing material needs to be increased in order to improve the soundproofing performance, which is a common sense in the conventional technique based on the mass law (FIG. 6). In other words, it was believed that the soundproofing material that exhibits high soundproofing performance over a wide range of frequencies of 2000 Hz or less cannot be made of a lightweight material. Meanwhile, the soundproofing material according to the present invention exhibits excellent soundproofing performance by greatly deviating from the performance trend (that is, exhibits relatively high soundproofing performance even at low density (lightweight)) (FIG. 7).

Figure 7:
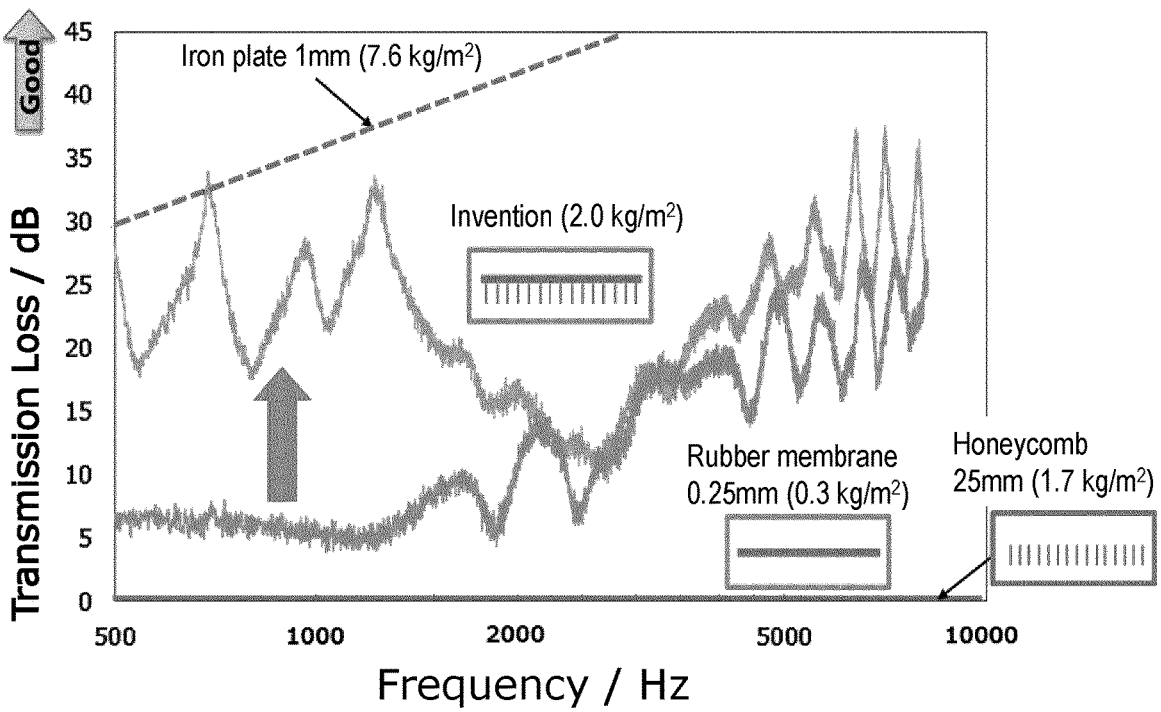
FIG. 7 is a graph for describing the soundproofing performance (transmission loss) of the soundproofing material according to the present invention in comparison with a soundproofing material composed of only a lattice-like structure (support portion) having a honeycomb structure, a soundproofing material composed of only a single wall, and a soundproofing material composed of an iron plate.

More specifically, as shown in FIG. 7, the soundproofing performance is not exhibited at all by only a lattice-like structure (support portion) having a honeycomb structure. In the case of the soundproofing material composed of the single wall, the soundproofing performance according to the mass law only with a sheet (rubber film) having elasticity remains to be exhibited (transmission loss increases in the high frequency range but transmission loss decreases in the low frequency range). Therefore, in order to exhibit the soundproofing performance in the low frequency range (in particular, in a region of 2000 Hz or less), it is necessary to use a material having a very large surface density (that is, heavy) such as an iron plate. Meanwhile, the soundproofing material according to the present invention having the above-described configuration exhibits the soundproofing performance according to the mass law in the high frequency range, in which the value of transmission loss decreases as the frequency decreases. Meanwhile, even if the soundproofing material according to the present invention is lightweight, it is possible to exhibit excellent soundproofing performance even at a low frequency range (in particular, a region of 2000 Hz or less) with a certain frequency (resonance frequency) as a boundary.

Such a significant improvement in the soundproofing performance in the low frequency range cannot be described by the mass law. Therefore, the present inventors have intensively studied various patterns as a model for describing the phenomenon that cannot be described by the conventional technique. In the process, the present inventors have surprisingly discovered that the soundproofing performance in the low frequency range is exhibited according to "rigidity law" which is a sound insulation principle different from the mass law. Hereinafter, this will be described.

A theoretical value of the transmission loss (TL) in the soundproofing material according to this rigidity law is calculated according to the following Expression 3 using a frequency (f) of a sound wave to be targeted, a surface density (m; mass per unit area) of the soundproofing material, and a surface rigidity (K) of the soundproofing material. The surface rigidity (K) is a spring constant when one of the partition portions of a sheet partitioned by a support portion (lattice-like structure) approximates a mass spring model that has a mass of mass m and vibrates with respect to the incidence of the sound wave, and as the K value increases, the partition portion is more difficult to deform with respect to the incidence of the sound wave.

[Math. 4]

$$TL[dB] \approx 20\log_{10}\left(4\pi^2 \cdot m \cdot f - \frac{K}{f}\right) - 43 \quad \text{[Expression 3]}$$

Figure 8:
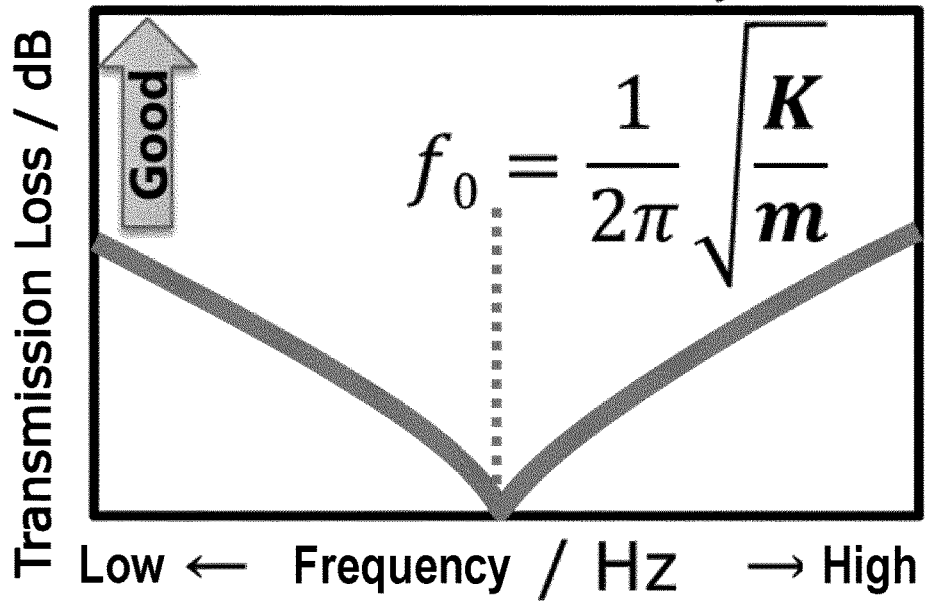
FIG. 8 is a diagram for describing the soundproofing performance according to a rigidity law.

When this Expression is solved for the frequency (f) under the condition that TL takes a minimum value, a value of a resonance frequency ($f_3$) is expressed by the following Expression 4 (FIG. 8).

[Math. 5]

$$f_0 = \frac{1}{2\pi}\sqrt{\frac{K}{m}} \quad \text{[Expression 4]}$$

Figure 9:
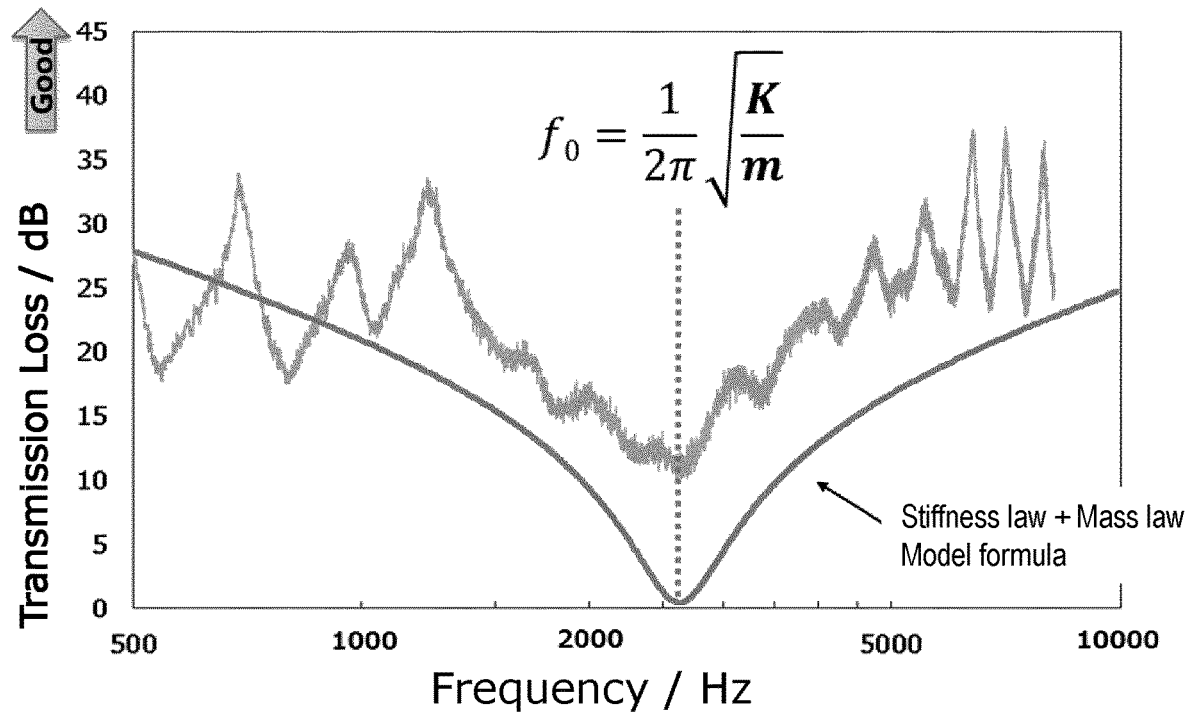
FIG. 9 is a graph showing a model formula in comparison with an actual measurement value of the transmission loss when it is assumed that both the mass law (FIG. 6) and the rigidity law (FIG. 8) are involved in the soundproofing performance of the soundproofing material according to the present invention.

Based on this, the present inventors tried to create a model formula when it is assumed that both the mass law (FIG. 6) and the rigidity law (FIG. 8) are involved in the expression of the soundproofing performance. It has been confirmed that the model formula matches the result of the actually measured transmission loss (TL), and it has been verified that both the mass law and the rigidity law are involved in the exhibition mechanism of the soundproofing performance by the soundproofing material according to the present aspect (FIG. 9).

It is considered that in the exhibition mechanism of the soundproofing performance by the soundproofing material according to the present aspect, the reason why not only the mass law but also the rigidity law are involved has not been fully clarified, but the partition portions of the sheet having elasticity are each partitioned by the support portion (lattice-like structure having a cylindrical cell) to improve the rigidity of the sheet (that is, it is less likely to vibrate). Therefore, the present inventors have presumed that the mechanism can be well described by the approximation by the above-described mass spring model.

Based on the above mechanism, the present inventors have further studied the elements necessary for designing the soundproofing characteristics of the soundproofing material. In the process, the present inventors approximate each partition portion of the sheet having elasticity with a disk having a radius a having the same area, and calculate the surface rigidity (k; in present specification, the value of the surface rigidity in the case of following this approximation shall be expressed by a smaller letter k) of the partition portion when a load p is applied by the following Expression 5 using an average deflection ($W_{ave}$) when the disk vibrates in the peripheral fixed and uniform load mode. In the present specification, the k value is used in the above Expression 1.

[Math. 6]

$$k = \frac{p}{w_{ave}} = \frac{16}{(1-v^2)}\frac{E \cdot h^3}{a^4} \quad \text{[Expression 5]}$$

In Expression 5, $v$ represents a Poisson's ratio of the sheet in the partition portion; E represents a Young's modulus [Pa] of the sheet in the partition portion; and h represents a film thickness [m] of the sheet in the partition portion. The radius a when the partition portion approximates a disk represents an area equivalent circle radius [m] of the partition portion. As an example, when the partition portion is a hexagon of which length of one side is 1 (L), an area $S_{hex}$ of the partition portion (hexagon) is calculated by the following Expression 6.

[Math. 7]

$$S_{hex} = \frac{3\sqrt{3}}{2}l^2 \quad \text{[Expression 6]}$$

Thus, an equivalent circle radius $a_{eq}$ (a radius of a circle having an area equal to the area of the partition portion (hexagon)) of the partition portion (hexagon) is calculated by the following Expression 7.

[Math. 8]

$$a_{eq} = \sqrt{\frac{3\sqrt{3}}{2}}l \approx 0.909l \quad \text{[Expression 7]}$$

When the value of the surface rigidity (k) calculated in this way is adopted as the value of the surface rigidity (K) in Expression 4 described above, the value of the resonance frequency ($f_3$) can be expressed by the following Expression 8.

[Math. 9]

$$f_0 = \frac{1}{2\pi}\sqrt{\frac{k}{m}} = \frac{1}{2\pi}\sqrt{\frac{1}{m}\frac{16}{(1-v^2)}\frac{E\cdot h^3}{a^4}}$$ [Expression 8]

The surface density (m) of the sheet in the partition portion can be expressed by the following Expression 9.

[Math. 10]

$$m = \rho \cdot h$$ [Expression 9]

In the above Expression 3, ρ represents a density [kg/m³] of the sheet in the partition portion, and h represents the film thickness [m] of the sheet in the partition portion.

Therefore, from the above Expressions 8 and 9, the value of the resonance frequency ($f_0$) can be expressed by the following Expression 10 using the value of the density (ρ; mass per unit volume; kg/m³) of the sheet in the partition portion and the value of the film thickness [m] of the sheet in the partition portion described above. This means that the value of the resonance frequency ($f_0$) indicated by the soundproofing material can be controlled by variously changing the size or shape of the partition portion, and the material and film thickness of the sheet in the partition portion.

[Math. 11]

$$f_0 = \frac{1}{2\pi}\sqrt{\frac{k}{m}} =$$

$$\frac{1}{2\pi}\sqrt{\frac{1}{m}\frac{16}{(1-v^2)}\frac{E\cdot h^3}{a^4}} = \frac{1}{2\pi}\sqrt{\frac{16}{(1-v^2)\cdot\rho}\frac{E\cdot h^2}{a^4}}$$ [Expression 10]

As described above, the problem to be solved by the present invention is to provide a soundproofing material capable of exhibiting high soundproofing performance over a wide range of a frequency range of 2000 Hz or less. As shown in FIGS. 8 and 9, the soundproofing performance (value of the transmission loss) according to the rigidity law becomes better as the frequency decreases with the resonance frequency ($f_0$) as a boundary. Therefore, the present inventors thought that the soundproofing performance for sound in a frequency range of 2000 Hz or less can be improved by setting the resonance frequency ($f_0$) to a value equal to or greater than a certain value. Based on this idea, according to the above-described Expression 10, in the soundproofing material including the sheet having elasticity and the support portion that partitions the sheet into partition portions while supporting the sheet, a number of soundproofing materials having different resonance frequencies ($f_0$) were produced by variously changing the size or shape of the partition portion or the material and film thickness of the sheet in the partition portion, and the soundproofing performance was evaluated for each of the soundproofing materials (in particular, in the frequency range of 2000 Hz or less). As a result, the surface rigidity (k; calculated by the above Expression 5) of the sheet and the surface density (m; calculated by the above Expression 9) of the sheet in the partition portion satisfy the relationship of the following Expression 1, and thus in particular, it was confirmed that the excellent soundproofing performance can be exhibited even in a frequency range of 2000 Hz or less. The following Expression 1 means that the resonance frequency ($f_0$) calculated based on the above-described approximation is greater than 900 [Hz].

[Math. 12]

$$\frac{1}{2\pi}\sqrt{\frac{k}{m}} > 900[Hz]$$ [Expression 11]

Here, there are no particular limitations on the form of the value on the left-hand side in the above Expression 1, and can be appropriately set according to the frequency range in which the soundproofing performance is to be exhibited on the soundproofing material. In general, the resonance frequency shifts to a higher frequency side as the value on the left-hand side in the above Expression 1 is increased, and therefore the value may be appropriately set in consideration of the shifted resonance frequency. As an example, the value on the left-hand side in the above Expression 1 is preferably 2000 Hz or more, more preferably 3000 Hz or more, still more preferably 4000 Hz or more, and particularly preferably 5000 Hz or more. The value of the left-hand side in the above Expression 1 is, for example, 10,000 Hz or more, for example, 50,000 Hz or more, for example, 100,000 Hz or more. In the soundproofing material that exhibits the soundproofing performance within the scope of the technical idea according to the present invention, the upper limit of the value on the left-hand side in the above Expression 1 is preferably 1,000,000 Hz or less, more preferably 800,000 Hz or less, and still more preferably 600,000 Hz or less.

By the way, in the technique disclosed in Non-Patent Document 1, as a result that the cell size is too large, the surface rigidity of the sheet having elasticity is reduced, and a value of $(k/m)^{1/2}/2\pi$ is not 900 Hz or more, and therefore it is considered that the excellent soundproofing performance cannot be exhibited particularly in a frequency range of 2,000 Hz or less.

Conventionally, a resin structure including a core layer in which a plurality of cells are arranged in parallel and skin layers disposed on both surfaces of the core layer has been proposed for various applications, and attempts have been made to impart sound absorbency and sound insulation property to the resin structure. However, the conventional technique intended to impart the sound absorbency and the sound insulation property to such a resin structure is based on the premise that the skin layer is provided with communication holes through which the inside and outside of the cells constituting the core layer communicate with each other. Even in the case where the communication holes are provided on the skin layer as described above, the surface rigidity of the sheet having elasticity cannot be sufficiently ensured. As a result, since the value of $(k/m)^{1/2}/2\pi$ does not exceed 900 Hz or more, it is not possible to exhibit the excellent soundproofing performance particularly in a frequency range of 2000 Hz or less. Meanwhile, in the resin structure having the same structure as described above, techniques that are not based on the premise that the communication holes as described above are provided on the skin layer have also been proposed in the past, but does not relate to the sound absorption, the sound insulation, or the soundproofing and the like. Some of these techniques are intended to be applied to applications requiring rigidity such as containers, shelves, pallets, and panels for the purpose of improving mechanical strength such as bending rigidity and bending strength. Furthermore, in another proposal using the same resin structure, since the skin layer is required to contain an impact resistance improving material for reducing the elastic modulus of the skin layer, the skin layer is highly likely not to correspond to the "sheet having elasticity" in the present invention. In another proposal using the same resin structure, a metal member having a thickness of about 0.05 to several mm is disposed as a skin layer, and a material having high rigidity is also used for the skin layer. For this reason, in the conventional technique related to the resin structure in which the communication holes are not provided on the skin layer, as a result that the value of the surface rigidity in the present invention becomes too large, it is considered that the value of $(k/m)^{1/2}/2\pi$ is so large that it cannot be measured (on the high frequency side).

Hereinafter, the constituent elements of the soundproofing material 10 will be described in more detail.

(Sheet Having Elasticity)

There are no particular limitations on the constituent materials of the sheet having elasticity (corresponding to the latex rubber sheet 200 shown in FIGS. 1 and 2), and various materials can be used as long as the constituent materials are materials having elasticity. In the present specification, the fact that the sheet "has elasticity" means that the sheet is made of a material of which value of the Young's modulus is in a range of 0.001 to 70 [GPa]. The value of the Young's modulus can be measured according to JIS K7161-1 (2014) for resins. The Young's modulus of a metal can be measured according to JIS Z2241 (2011). The Young's modulus of the rubber can be measured according to JIS Z6251 (2010). As the constituent material of the sheet having elasticity, in addition to the latex rubber used in the above-described embodiment, rubber materials such as chloroprene rubber (CR), styrene-butadiene rubber (SBR), ethylene-propylene-diene rubber (EPDM), and acrylonitrile-butadiene rubber (NBR) can be used as well. A resin material, a metal material, or a paper material or the like may be used as the sheet having elasticity. Furthermore, a material having a buffer function such as air cushion may also be used. All of these materials including the rubber materials have high elasticity to the extent that the effect of the soundproofing material according to the present aspect can be expressed. Examples of the resin materials include polyethylene (for example, low density polyethylene, high density polyethylene, and the like), polyolefin resins such as polypropylene, a polyvinyl chloride resin, an acrylic resin, a methacrylic resin, an acrylonitrile-butadiene-styrene resin, a vinyl acetate resin, an ethylene-acetic acid vinyl resin, and a styrene-butadiene resin, and the like. As the thermosetting resin, a silicone resin, a urethane resin, a melamine resin, a thermosetting acrylic resin, a urea resin, a phenol resin, a resorcin resin, an alkyl resorcin resin, an epoxy resin, or thermosetting polyester or the like can be used. Resin precursors such as prepolymers, oligomers and monomers that produce these resins such as a urethane resin prepolymer, a urea resin prepolymer (initial condensate), a phenol resin prepolymer (initial condensate), a diallyl phthalate prepolymer, an acrylic oligomer, a polyvalent isocyanate, a methacrylic ester monomer, and a diallyl phthalate monomer may be used. Examples of the metal materials include copper and aluminum and the like. The constituent material of the sheet having elasticity is not limited thereto, and other materials may of course be used. As the constituent material of the sheet having elasticity, a rubber material is preferable, and of these, latex rubber or EPDM rubber is more preferable. By using these rubber materials as the constituent material of the sheet having elasticity, the soundproofing effect by a soundproofing material according to the present invention can be suitably expressed. These rubber materials are said to be particularly preferred because of significantly contributing to low fuel consumption, particularly considering the application to vehicle applications in that these rubber materials are lightweight. Furthermore, from the viewpoint of cost reduction, polyolefin resins such as polypropylene are also preferable as the constituent material of the sheet having elasticity.

The film thickness of the sheet having elasticity is preferably 10 to 1000 μm, and more preferably 100 to 500 μm, from the viewpoint of the soundproofing effect of the soundproofing material.

(Support Portion (Lattice-Like Structure))

The support portion partitions the sheet into partition portions (hermetically partitioned) while supporting the above-described sheet having elasticity. If the support portion has the configuration which can express such a function, there are no particular limitations on the specific configuration of the support portion. Although FIGS. 1 to 3 are described as having a large number of partition portions, even a single partition portion is within the scope of the present invention.

There are no particular limitations on the constituent material of the support portion, and the conventionally known thermoplastic resins or thermosetting resins can be used in addition to the polyvinyl chloride resin used in the above-described embodiment. A metal material or other materials may be used as the constituent material of the support portion. All of these materials have physical properties suitable for holding the sheet having elasticity and partitioning the sheet into the partition portions.

Examples of the thermoplastic resins include polyethylene (for example, low density polyethylene and high density polyethylene and the like), polyolefin resins such as polypropylene, an acrylic resin, a methacrylic resin, an acrylonitrile-butadiene-styrene resin, a vinyl acetate resin, an ethylene-acetic acid vinyl resin, and a styrene-butadiene resin and the like, in addition to a polyvinyl chloride resin. As the thermosetting resin, a urethane resin, a melamine resin, a thermosetting acrylic resin, a urea resin, a phenol resin, a resorcin resin, an alkyl resorcin resin, an epoxy resin, or thermosetting polyester or the like can be used. Resin precursors such as prepolymers, oligomers and monomers that produce these resins such as a urethane resin prepolymer, a urea resin prepolymer (initial condensate), a phenol resin prepolymer (initial condensate), a diallyl phthalate prepolymer, an acrylic oligomer, a polyvalent isocyanate, a methacrylic ester monomer, and a diallyl phthalate monomer may be used. Among these, the thermoplastic resin is preferably used from the viewpoint of easy molding, and a vinyl chloride resin and a polyolefin resin are particularly preferable because they are lightweight, excellent in durability, and inexpensive.

As described above, the support portion is preferably a lattice-like structure having a large number of continuously formed cylindrical cells. In this case, the support portion partitions the sheet having elasticity into a plurality of partition portions. Furthermore, it is more preferable that at least a part of the plurality of partition portions constitutes a regular arrangement structure in which a plurality of partition portions having the same outline shape are regularly arranged. By adopting such a configuration, it is possible to specifically express the soundproofing performance for sound waves in a desired frequency range by the presence of a large number of partition portions which are easily manufactured and have the same shape. At this time, from the viewpoint of further exhibiting the soundproofing performance, the ratio of the occupied area of the regular arrangement structure to the area of the sheet having elasticity is preferably 80 to 100%, more preferably 90 to 100%, still more preferably 95 to 100%, yet still more preferably 98 to 100%, particularly preferably 99 to 100%, and most preferably 100%. At least one lattice-like structure (support portion) for one sheet may be divided into a plurality of members. With such a configuration, it is preferable that the soundproofing material according to the present aspect has flexibility as a whole. However, even if the support portion is not divided into a plurality of members, it is a preferable embodiment that the soundproofing material has flexibility as a whole. As described above, since the soundproofing material has flexibility, it is possible to dispose the soundproofing material in the form that follows sound sources of various shapes, which is preferable.

The outline shape of the partition portion in the above-described regular arrangement structure (cross-sectional shape of the cylindrical cell in the cross section perpendicular to the extending direction of the lattice-like structure) is not limited to a regular hexagon as shown in FIGS. 2 to 4, and other shapes may be used. If a large number of cylindrical cells are disposed by continuously forming regular polygons having the same cross-sectional shape, a regular quadrangle (square) and a regular triangle can be adopted as the cross-sectional shape in addition to a regular hexagon. By adopting these shapes, it is possible to provide a support that is easy to manufacture and exhibits excellent strength. If the cross-section of the lattice-like structure is a pattern in which a plurality of regular polygons are regularly disposed, the cross section of the lattice-like structure can be configured to have the pattern by any combinations of (four regular triangles and one regular hexagon), (three regular triangles and two regular quadrangle (squares))×2 ways, (one regular triangle, two regular quadrangles (squares), and one regular hexagon), (two regular triangles and two regular hexagons), (one regular triangle and two regular dodecagons), (one regular quadrangle (square), one regular hexagon, and one regular dodecagon), and (one regular quadrangle (square) and two regular octagons) by an Archimedes' plane filling method, for example. Among these, from the viewpoint of maximizing crushing strength per unit mass, as shown in FIGS. 2 to 4, it is most preferable that the cross-sectional shape of the cylindrical cell is a regular hexagon (that is, the lattice-like structure has a honeycomb structure).

There are no particular limitations on the specific value as long as the size of the cylindrical cell constituting the lattice-like structure satisfies the above-described Expression 1. In a preferred embodiment where the lattice-like structure has a honeycomb structure, as shown in FIGS. 2 and 3, it is preferable that the size of the cylindrical cell (distance between the opposing parallel sides in the regular hexagon of the cross-sectional shape) is 6.0 mm or less. By having such a size, the excellent soundproofing performance can be exhibited. The size of the cylindrical cell (distance between the opposing parallel sides in a regular hexagon of a cross-sectional shape) may be 5.9 mm or less, 5.8 mm or less, 5.7 mm or less, 5.6 mm or less, 5.5 mm or less, 5.4 mm or less, 5.3 mm or less, 5.2 mm or less, 5.1 mm or less, 5.0 mm or less, 4.9 mm or less, 4.8 mm or less, 4.7 mm or less, 4.6 mm or less, 4.5 mm or less, 4.4 mm or less, 4.3 mm or less, 4.2 mm or less, 4.1 mm or less, and 4.0 mm or less and the like, and these numerical ranges are more preferably smaller. There are no particular limitations on the lower limit of the size of the cylindrical cell, but if the size of the cylindrical cell is too small, the mass of the lattice-like structure (furthermore, the soundproofing material) increases, and is preferably 2.0 mm or more.

The thickness of the wall of the cylindrical cell (distance t shown in FIG. 4) is preferably 10 to 150 µm, and more preferably 30 to 100 µm.

Figure 10:
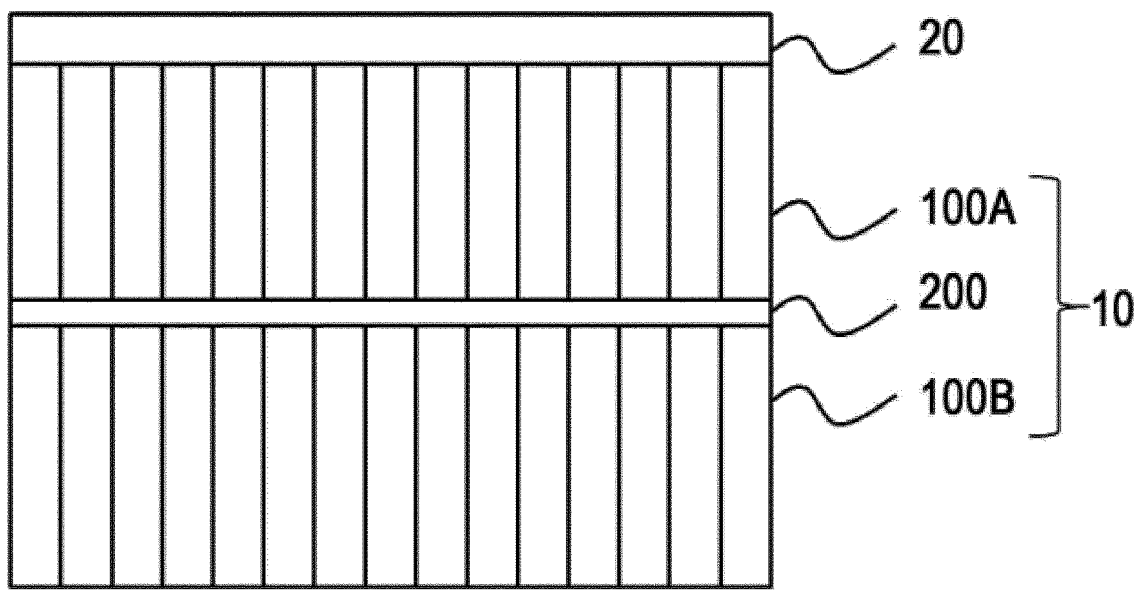
FIG. 10 is a side view showing the appearance of a soundproofing structure according to another embodiment of the present invention.

In the embodiment shown in FIGS. 1 to 4, the lattice-like structure (support portion) is provided only on one surface of the sheet having elasticity. However, as shown in FIG. 10, even in the form in which the lattice-like structures (support portions) are provided on both surfaces of at least one sheet having elasticity, it is possible to exhibit the excellent soundproofing performance in the same manner. In this case, the forms of the lattice-like structures (first lattice-like structure (first support portion) 100A and second lattice-like structure (second support portion) 100B) provided on both surfaces of the sheet having elasticity, respectively, may be the same or different from each other. Among these, it is preferable that the forms of the lattice-like structures (first lattice-like structure 100A (first support portion) and second lattice-like structure (second support portion) 100B) provided on both surfaces of the sheet having elasticity, respectively, are different from each other. At this time, it is more preferable to dispose the lattice-like structures so that the shapes of the cylindrical cells of the lattice-like structures (first lattice-like structure 100A (first support portion) and second lattice-like structure (second support portion) 100B) are exactly overlapped on both surfaces of the sheet having elasticity. With such a configuration, there is an advantage that particularly excellent soundproofing performance can be exhibited. At this time, the thicknesses of the first and second support portions may be substantially the same. In other words, the thickness of one of the first and second support portions may be 19/20 to 20/19 times that of the other. Furthermore, the thicknesses of the first and second support portions may be substantially different. In other words, the thickness of one of the first and second support portions may be more than 20/19 times that of the other. Thus, by controlling the thicknesses of the first and second support portions, the frequency range that exhibits the soundproofing effect and is targeted can be precisely controlled.

As described above, the constituent materials of the support portions are not particularly limited, but the constituent materials of the first and second support portions may be the same, or may be different from each other. Thus, by selecting the constituent materials of the first and second support portions, the frequency range that exhibits the soundproofing effect and is targeted can be precisely controlled.

In the present aspect, as the height of the lattice-like structure (support portion) in the extending direction increases, particularly excellent soundproofing performance tends to be exhibited over the range of the low frequency range of 2000 Hz or less. From such a viewpoint, the lattice-like structure (support portion) is preferably a single structure having a uniform height. In this case, the height (distance h shown in FIG. 2) of the lattice-like structure in the extending direction is preferably 5 mm or more, more preferably 6 mm or more, still more preferably 13 mm or more, yet still more preferably 19 mm or more, particularly preferably 22 mm or more, and most preferably 25 mm or more.

The soundproofing material according to the present aspect is preferably lightweight as described above. From this viewpoint, the surface density of the soundproofing material according to the present aspect as a whole is preferably less than 3.24 kg/m$^2$, more preferably 2.0 kg/m$^2$ or less, still more preferably 1.5 kg/m² or less, and particularly preferably 1.0 kg/m² or less.

The soundproofing material according to the present aspect is disposed on the substrate to constitute the soundproofing structure, whereby the soundproofing material can be suitably used for shielding noise from various sound sources.

As the substrate constituting the soundproofing structure, basically, a non-permeability metal plate (an iron plate or an aluminum plate or the like) and a resin plate and the like can be used. The thickness of the substrate is preferably in a range of 0.5 to 2.0 mm in the case of the metal plate, and preferably in a range of 0.5 to 20 mm in the case of the resin plate.

The soundproofing material according to the present aspect and the soundproofing structure using the soundproofing material can be configured to be very lightweight. The soundproofing material and the soundproofing structure according to the present aspect can be lightweight as described above, and therefore are preferably used by being mounted on a vehicle. In particular, the present invention is most preferably applied to the soundproofing application for noise generated from a portion (natural sound source), such as an engine, a transmission, or a drive system, that generates a loud sound. As an example of the application portions, the present invention can be applied to, for an engine compartment, an engine head cover, an engine body cover, a hood insulator, an insulator in front of a dash, a partition wall of an air box, an air cleaner of an air intake, a dust side duct, and an under cover and the like. The present invention can be applied to, for a cabin, a dash insulator, a dash panel, a floor carpet, a spacer, a door trim of a door, a soundproofing material in the door trim, a soundproofing material in a compartment, an instrument panel, an instrument center box, an instrument upper box, an air conditioner casing, a roof trim, a soundproofing material in the roof trim, a sun visor, an air conditioning duct for a rear seat, a cooling duct for a battery cooling system in a vehicle with which a battery is equipped, a cooling fan, a trim of a center console, a soundproofing material in a console, a parcel trim, a parcel panel, a headrest of a seat, a seat back of a front seat, and a seat back of a rear seat, and the like. Furthermore, the present invention can be applied to, for a trunk, a trim of a trunk floor, a trunk board, a trim of a trunk side, a soundproofing material in the trim, and a draft cover and the like. The present invention can be applied to the inside of a vehicle skeleton or between panels, and can be applied to, for example, a trim of a pillar and a fender. Furthermore, the present invention can be applied to each member of a vehicle body, for example, an under cover under a floor, a fender protector, a back door, a wheel cover, and an aerodynamic cover for the suspension, and the like. Therefore, as the substrate constituting the soundproofing structure, a metal plate and a resin plate and the like as the constituent material of the various application portions described above can be used as is.

There are no particular limitations on the disposition form of the soundproofing structure when the soundproofing structure according to the present aspect is disposed for the sound source. When the soundproofing structure according to the present aspect is disposed for the sound source, it is preferable to dispose the soundproofing structure so that the sound source is positioned in the extending direction of the cylindrical cell constituting the lattice-like structure (support portion). When the soundproofing structure is disposed in this way, the soundproofing structure may be disposed so that the sheet having elasticity and constituting the soundproofing material is positioned on the sound source side or disposed so that the opening of the cylindrical cell constituting the soundproofing material is positioned on the sound source side, but from the viewpoint of more excellent soundproofing performance, the former disposition form is more preferable.

EXAMPLES

Hereinafter, the present invention will be described in more detail with reference to Examples. However, the technical scope of the present invention is not limited to only the following Examples.

<<Evaluation of Soundproofing Performance of Soundproofing Structure>>

Figure 11:
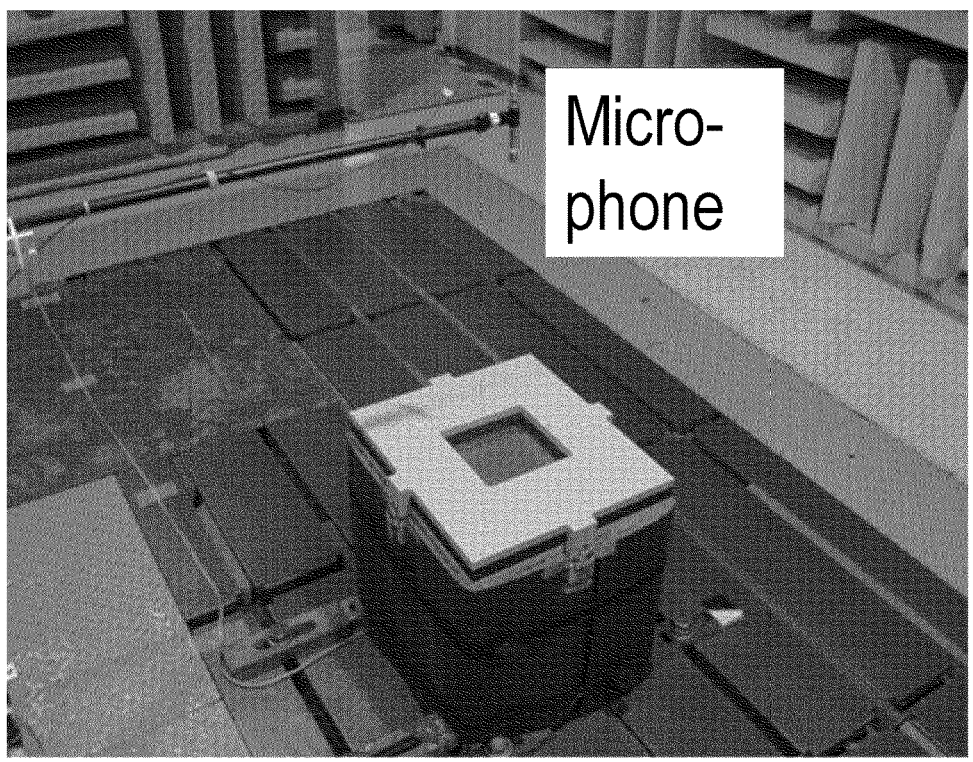
FIG. 11 is a photograph for describing the disposition of a measurement system (sound insulation box and microphone) used for evaluating the soundproofing performance in the section of Examples to be described later.

Soundproofing performance for sound waves of each frequency was measured for a soundproofing structure produced by each of Examples and Comparative Examples to be described later. Specifically, a speaker (sound source) was disposed inside a sound insulation box made of iron metal pot as shown in FIG. 11, and a sample (soundproofing structure) was disposed in an opening of the sound insulation box. In order to prevent sound leakage from the periphery of the sample (soundproofing structure) at the opening of the sound insulation box, a rubber sheet was disposed around the sample (soundproofing structure). By generating sound from the speaker (sound source) installed inside the sound insulation box and measuring an insertion loss [unit: dB] relative to the case where the sample (soundproofing structure) was not disposed (control), the soundproofing performance was evaluated. It means that the larger the value of the insertion loss at a certain frequency, the better the soundproofing performance for the sound wave of the frequency. Unless otherwise specified in the section of the following Examples and Comparative Examples, the evaluation was made by disposing the soundproofing structure so that a substrate (iron plate) was positioned on the opposite side of a microphone. The sound source generation conditions were as follows:

Spectral level: White noise (100 to 8192 Hz)

$F_{max}$: 8192 Hz

Average value: Addition average of 300 times (measurement was performed 300 times while slightly shifting time in one-time measurement, and the addition average was set as the measured value)

Overlap: 75%.

Production of Soundproofing Material

Manufacturing Example 1

Prepared were a sheet having elasticity (sheet made of latex rubber; film thickness: 0.25 mm) and a honeycomb structure (honeycomb support having a large number of regular hexagonal cross sections) made of polyvinyl chloride (PVC) (support thickness: 25 mm). Here, a size (distance between opposing parallel sides in a regular hexagon of a cross-sectional shape of the honeycomb structure; distance W shown in FIG. 4) of a cylindrical cell constituting the honeycomb structure was set to 4 mm. Next, an opening cross section of the honeycomb structure was hermetically adhered to one surface of the sheet to produce a soundproofing material having a structure shown in FIG. 2.

Manufacturing Example 2

A soundproofing material of the present manufacturing example was produced in the same manner as in the above-described Manufacturing Example 1 except that the thickness of a honeycomb structure (support) was set to 12.5 mm.

Manufacturing Example 3

A soundproofing material of the present Manufacturing Example was produced in the same manner as in the above-described Manufacturing Example 1 except that the thickness of a honeycomb structure (support) was set to 6 mm.

Manufacturing Example 4

A soundproofing material of the present Manufacturing Example was produced in the same manner as in the above-described Manufacturing Example 1 except that PVC honeycomb structures (cell size: 4 mm) having a thickness of 12.5 mm were disposed (adhered) on both surfaces of a sheet having elasticity (sheet made of latex rubber).

Manufacturing Example 5

A soundproofing material of the present Manufacturing Example was produced in the same manner as in the above-described Manufacturing Example 4 except that the thicknesses of honeycomb structures (supports) disposed on both surfaces of a sheet having elasticity (sheet made of latex rubber) were set to 6 mm.

Manufacturing Example 6

A soundproofing material of the present Manufacturing Example was produced in the same manner as in the above-described Manufacturing Example 4 except that the thickness of one of honeycomb structures (supports) disposed on surfaces of a sheet having elasticity (sheet made of latex rubber) was set to 6 mm, and the thickness of the other was set to 12.5 mm.

The specifications of the soundproofing materials produced in the above Manufacturing Examples are shown in the following Table 1.

TABLE 1

| Soundproofing material | Structure | Whole thickness [mm] | Whole area density [kg/m$^2$] | Material of support | Thickness of support [mm] | Surface density of support [kg/m$^2$] | Cell size [mm] | Material of sheet | Film thickness of sheet m [mm] | Surface density of sheet m [kg/m$^2$] | Surface rigidity of sheet k [N/mm] | $(k/m)^{1/2}/2n$ [Hz] |
|---|---|---|---|---|---|---|---|---|---|---|---|---|
| Manufacturing Example 1 | Latex sheet + PVC honeycomb support, support thickness: 25 mm | Sheet and honeycomb support are adhered to each other | 25.25 | 1.88 | PVC | 25 | 1.64 | 4 | Latex | 0.25 | 0.24 | 82474 | 2935 |
| Manufacturing Example 2 | Latex sheet + PVC honeycomb support, support thickness: 12.5 mm | Sheet and honeycomb support are adhered to each other | 12.75 | 1.07 | PVC | 12.5 | 0.83 | 4 | Latex | 0.25 | 0.24 | 82474 | 2935 |
| Manufacturing Example 3 | Latex sheet + PVC honeycomb support, support thickness: 6 mm | Sheet and honeycomb support are adhered to each other | 6.25 | 0.62 | PVC | 6 | 0.38 | 4 | Latex | 0.25 | 0.24 | 82474 | 2935 |
| Manufacturing Example 4 | Latex sheet + PVC honeycomb support, support thickness: 25 mm (12.5 mm + 12.5 mm) | Honeycomb supports having same thickness are adhered to both surfaces of sheet | 25.25 | 1.88 | PVC | 12.5, 12.5 | 0.83, 0.83 | 4 | Latex | 0.25 | 0.24 | 82474 | 2935 |
| Manufacturing Example 5 | Latex sheet + PVC honeycomb support, support thickness: 12 mm (6 mm + 6 mm) | Honeycomb supports having same thickness are adhered to both surfaces of sheet | 12.25 | 1.00 | PVC | 6, 6 | 0.38, 0.38 | 4 | Latex | 0.25 | 0.24 | 82474 | 2935 |

TABLE 1-continued

| Sound-proofing material | Structure | Whole thickness [mm] | Whole area density [kg/m²] | Material of support | Thickness of support [mm] | Surface density of support [kg/m²] | Cell size [mm] | Material of sheet | Film thickness of sheet [mm] | Surface density of sheet m [kg/m²] | Surface rigidity of sheet k [N/mm] | $(k/m)^{1/2}/2n$ [Hz] |
|---|---|---|---|---|---|---|---|---|---|---|---|---|
| Manufacturing Example 6 | Latex sheet + PVC honeycomb support, support thickness: 18.5 mm (6 mm + 12.5 mm) | Honeycomb supports having different thicknesses are adhered to both surfaces of sheet | 18.75 | 1.46 | PVC | 6, 12.5 | 0.38, 0.83 | 4 | Latex | 0.25 | 0.24 | 82474 | 2935 |

Production of Soundproofing Structure

Comparative Example 1-1

An iron plate (thickness: 1 mm) was used as is as a soundproofing structure of the present Comparative Example.

Comparative Example 1-2

The soundproofing material produced in the above Manufacturing Example 1 was laminated with an iron plate (thickness: 1 mm) to produce a soundproofing structure of the present Comparative Example. At this time, the soundproofing material and the iron plate were disposed so that a sheet constituting the soundproofing material was adjacent to the iron plate.

Example 1-1

A soundproofing structure of the present Comparative Example was produced in the same manner as in the above-described Comparative Example 1-2 except that a soundproofing material and an iron plate were disposed so that a sheet constituting the soundproofing material was positioned on the opposite side to the iron plate (that is, an opening cross section of a support portion constituting the soundproofing material was adjacent to the iron plate).

Example 1-2

A soundproofing structure of the present Example was produced in the same manner as in the above-described Example 1-1 except that the soundproofing material produced in the above Manufacturing Example 4 was used. At this time, the soundproofing material and an iron plate were disposed so that one opening cross section of a support portion constituting the soundproofing material was adjacent to the iron plate.

Figure 12:
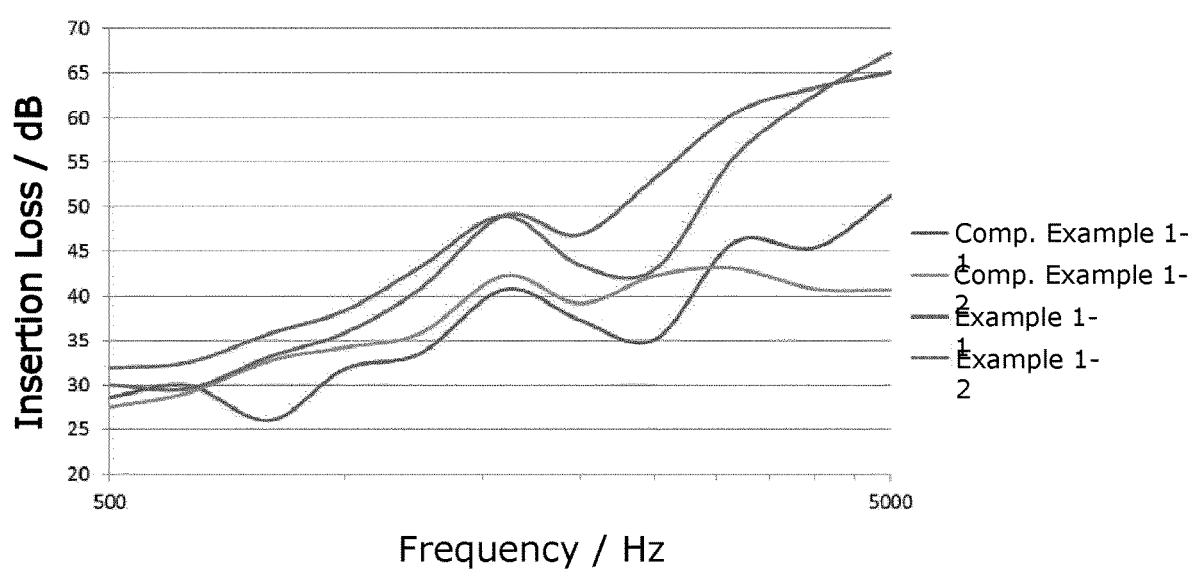
FIG. 12 is a graph showing results of measuring an insertion loss for a soundproofing material produced in a section of Examples to be described later.

FIG. 12 shows the results of insertion losses obtained by evaluating the soundproofing performances of the above Examples and Comparative Examples. As can be seen from these results, the soundproofing structure according to the present invention exhibits more excellent soundproofing performance than that of a soundproofing structure composed of only a substrate (iron plate) or a soundproofing structure in which a sheet having elasticity is in direct contact with a substrate (iron plate) even if a soundproofing material having the same configuration as that of the present invention is used.

Comparative Example 2-1

An iron plate (thickness: 1 mm) was used as is as a soundproofing structure of the present Comparative Example.

Comparative Example 2-2

The soundproofing material produced in the Manufacturing Example 2 was laminated with an iron plate (thickness: 1 mm) to produce a soundproofing structure of the present Comparative Example. At this time, the soundproofing material and the iron plate were disposed so that a sheet constituting the soundproofing material was adjacent to the iron plate.

Example 2-1

A soundproofing structure of the present Example was produced in the same manner as in the above-described Comparative Example 2-2 except that a soundproofing material and an iron plate were disposed so that a sheet constituting the soundproofing material was positioned on the opposite side of the iron plate (that is, an opening cross section of a support portion constituting the soundproofing material was adjacent to the iron plate).

Example 2-2

A soundproofing structure of the present Example was produced in the same manner as in the above-described Example 1-1 except that the soundproofing material produced in the Manufacturing Example 5 was used. At this time, the soundproofing material and an iron plate were disposed so that one opening cross section of a support portion constituting the soundproofing material was adjacent to the iron plate.

Figure 13:
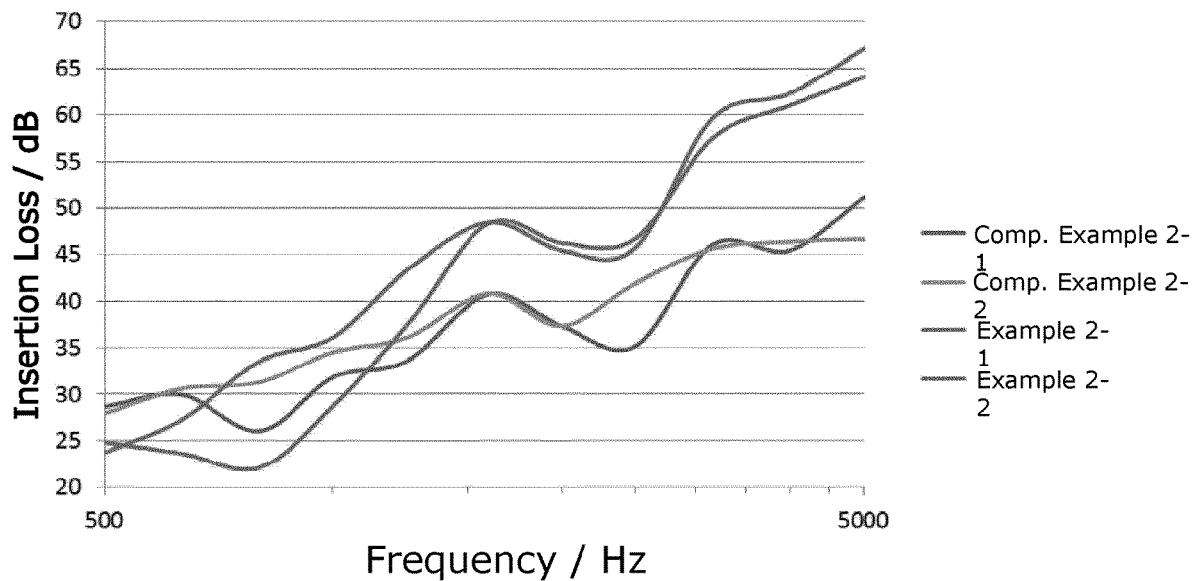
FIG. 13 is a graph showing results of measuring an insertion loss for a soundproofing material produced in a section of Examples to be described later.

FIG. 13 shows the results of insertion losses obtained by evaluating the soundproofing performances of the above Examples and Comparative Examples. As can be seen from these results, the soundproofing structure according to the present embodiment exhibits more excellent soundproofing performance than that of a soundproofing structure composed of only a substrate (iron plate) even when the thicknesses of the supports constituting the soundproofing material are different, or a soundproofing structure in which a sheet having elasticity is in direct contact with a substrate (iron plate) even if a soundproofing material having the same configuration as that of the present invention is used.

Comparative Example 3-1

An iron plate (thickness: 1 mm) was used as is as a soundproofing structure of the present Comparative Example.

Comparative Example 3-2

The soundproofing material produced in the above Manufacturing Example 3 was laminated with an iron plate (thickness: 1 mm) to produce a soundproofing structure of the present Comparative Example. At this time, the soundproofing material and the iron plate were disposed so that a sheet constituting the soundproofing material was adjacent to the iron plate.

Example 3-1

A soundproofing structure of the present Example was produced in the same manner as in the above-described Comparative Example 3-2 except that a soundproofing material and an iron plate disposed so that a sheet constituting the soundproofing material was positioned on the opposite side of the iron plate (that is, an opening cross section of a support portion constituting the soundproofing material was adjacent to the iron plate).

Figure 14:
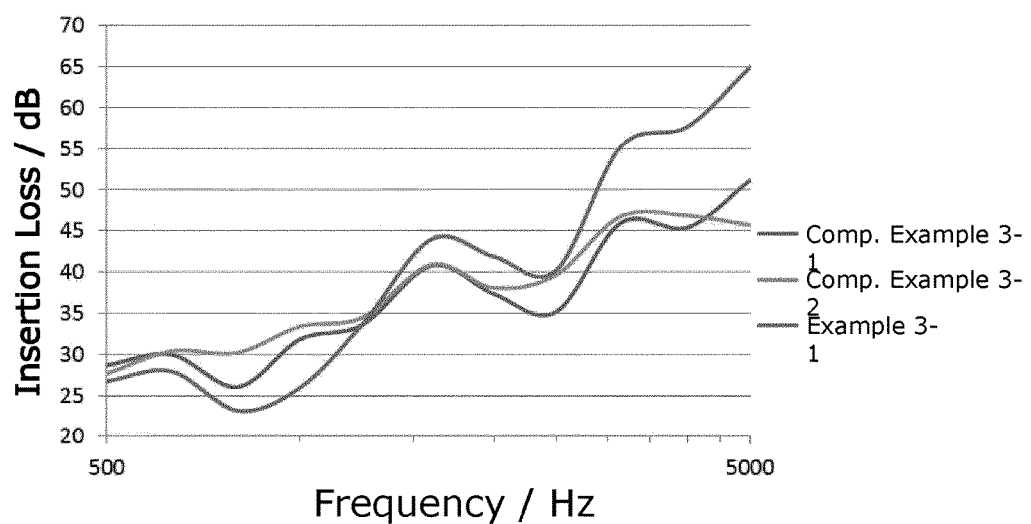
FIG. 14 is a graph showing results of measuring an insertion loss for a soundproofing material produced in a section of Examples to be described later.

FIG. 14 shows the results of insertion losses obtained by evaluating the soundproofing performances of the above Examples and Comparative Examples. As can be seen from these results, the soundproofing structure according to the present Example exhibits more excellent soundproofing performance than that of a soundproofing structure composed of only a substrate (iron plate) even when the thicknesses of the supports constituting the soundproofing material are different, or a soundproofing structure in which a sheet having elasticity is in direct contact with a substrate (iron plate) even if a soundproofing material having the same configuration as that of the present invention is used.

Comparative Example 4-1

An iron plate (thickness: 1 mm) was used as is as a soundproofing structure of the present Comparative Example.

Example 4-1

The soundproofing structure produced in Example 1-2 (obtained by laminating the soundproofing material produced in the Manufacturing Example 4 with an iron plate) was used as is as a soundproofing structure of the present Example.

Example 4-2

The soundproofing structure produced in Example 2-2 (obtained by laminating the soundproofing material produced in the Manufacturing Example 5 with an iron plate) was used as is as a soundproofing structure of the present Example.

Example 4-3

A soundproofing structure of the present Example was produced in the same manner as in the above-described Example 4-1 except that the soundproofing material produced in the Manufacturing Example 6 was used. At this time, the soundproofing material and an iron plate were disposed so that the opening cross section of a support portion having a thickness of 12.5 mm was adjacent to the iron plate among support portions constituting the soundproofing material.

Example 4-4

A soundproofing structure of the present Example was produced in the same manner as in the above-described Example 4-2 except that a soundproofing material and an iron plate were disposed so that the opening cross section of a support portion having a thickness of 6 mm was adjacent to the iron plate among support portions constituting the soundproofing material.

Figure 15:
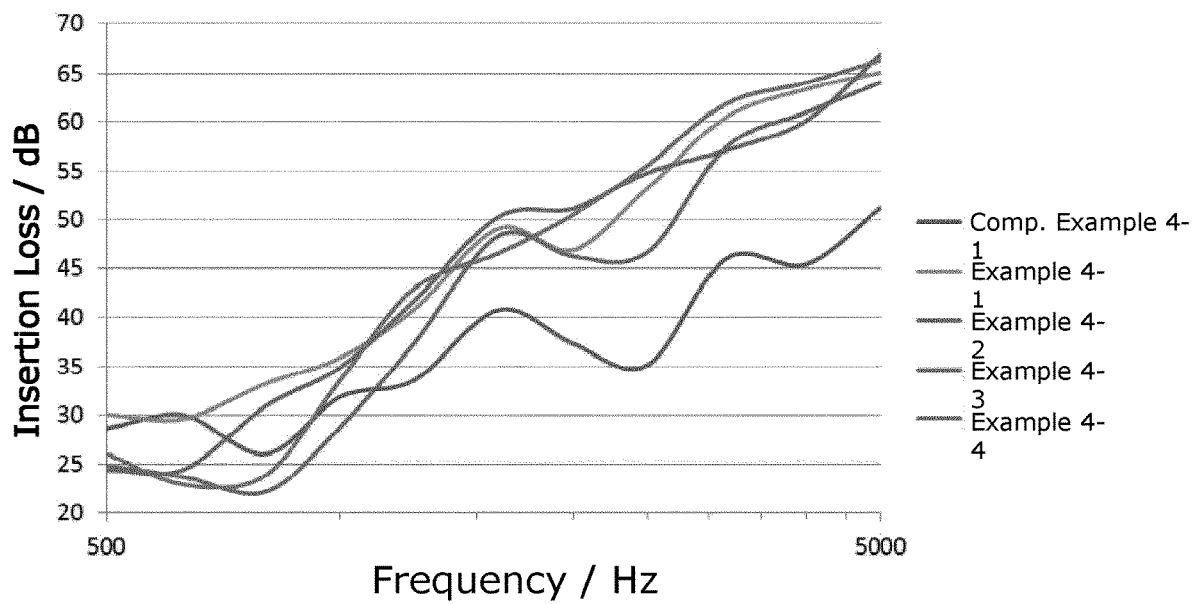
FIG. 15 is a graph showing results of measuring an insertion loss for a soundproofing material produced in a section of Examples to be described later.

FIG. 15 shows the results of insertion losses obtained by evaluating the soundproofing performances of the above Examples and Comparative Examples. As can be seen from these results, the soundproofing structure according to the present Example exhibits more excellent soundproofing performance than that of the soundproofing structure made of only the substrate (iron plate) or the soundproofing structure described in each of the above Comparative Examples even when the support portions of the soundproofing material constituting the soundproofing structure were disposed on both sides of the sheet having elasticity.

REFERENCE SIGNS LIST

1 Soundproofing structure
10 Soundproofing material
20 Substrate
100 Lattice-like structure (support portion)
100A First lattice-like structure (first support portion)
100B Second lattice-like structure (second support portion)
110, 110a Cylindrical cell
200 Latex rubber sheet (sheet having elasticity)
h Height of support (cylindrical cell) in extending direction
w Size of cylindrical cell (distance between opposing parallel sides in regular hexagon of cross-sectional shape)
a Length of one side of regular hexagon which is cross-sectional shape of cylindrical cell
t Thickness of inner wall (lattice wall) of cylindrical cell

The invention claimed is:
1. A soundproofing structure comprising:
a substrate; and
a soundproofing material disposed on the substrate, wherein
the soundproofing material includes a sheet having elasticity, and a support portion partitioning the sheet into a partition portion while supporting the sheet,
a surface rigidity (k) of the sheet and a surface density (m) of the sheet in the partition portion satisfy a relationship of the following Expression 1, and
the soundproofing material is disposed on the substrate so that the sheet is separated from the substrate:

$$\frac{1}{2\pi}\sqrt{\frac{k}{m}} > 900 [\text{Hz}]. \qquad [\text{Expression 1}]$$

2. The soundproofing structure according to claim 1, wherein the support portion partitions the sheet into a plurality of partition portions, and at least a part of the plurality of partition portions configures a regular arrangement structure in which the plurality of partition portions having the same outline shape are regularly arranged.

3. The soundproofing structure according to claim 1, wherein the support portion comprises a first support portion disposed on at least one surface of the sheet and a second support portion disposed on the other surface of the sheet.

4. The soundproofing structure according to claim 3, wherein the support portion is a single structure having a uniform height.

5. The soundproofing structure according to claim 4, wherein a thickness of one of the first support portion and the second support portion is 19/20 to 20/19 times a thickness of the other of the first support portion and the second support portion.

6. The soundproofing structure according to claim 4, wherein a thickness of one of the first support portion and the second support portion is more than 20/19 times a thickness of the other of the first support portion and the second support portion.

7. The soundproofing structure according to claim 1, wherein the constituent materials of the support portions disposed on both surfaces of the sheet are the same.

8. The soundproofing structure according to claim 1, wherein constituent materials of the support portions disposed on both surfaces of the sheet are different from each other.

* * * * *